United States Patent
Kanda (10) Patent No.: US 9,031,882 B2
(45) Date of Patent: May 12, 2015

(54) CATEGORY DETERMINATION DEVICE AND METHOD COMPRISING A FEATURE SPACE CONTAINING A CLOSED REGION USED TO DETERMINE THE CATEGORY OF A TARGET BASED ON THE POSITION OF THE TARGET WITHIN THE FEATURE SPACE WITH REFERENCE TO THE CLOSED REGION

(75) Inventor: Yamato Kanda, Hino (JP)

(73) Assignee: Olympus Corporation, Tokyo (JP)

( * ) Notice: Subject to any disclaimer, the term of this patent is extended or adjusted under 35 U.S.C. 154(b) by 567 days.

(21) Appl. No.: 12/702,638

(22) Filed: Feb. 9, 2010

(65) Prior Publication Data

US 2010/0135533 A1     Jun. 3, 2010

Related U.S. Application Data (63) Continuation-in-part of application No. PCT/JP2008/063210, filed on Jul. 23, 2008.

(30) Foreign Application Priority Data

Aug. 10, 2007    (JP) .................................. 2007-210379

(51) Int. Cl.
    *G06F 15/18*       (2006.01)
    *G06K 9/62*        (2006.01)

(52) U.S. Cl.
    CPC .................................... *G06K 9/6269* (2013.01)

(58) Field of Classification Search
None
See application file for complete search history.

(56) References Cited

U.S. PATENT DOCUMENTS

| 7,464,063 B2 * | 12/2008 | Vatchkov et al. ............... 706/45 |
| 7,620,246 B2 * | 11/2009 | Akahori ........................ 382/192 |
| 7,936,357 B2 * | 5/2011 | Yamada ........................ 345/581 |
| 2006/0142990 A1 * | 6/2006 | Vatchkov et al. ............... 703/23 |
| 2007/0025611 A1 * | 2/2007 | Kanda et al. .................. 382/149 |

FOREIGN PATENT DOCUMENTS

| JP | 04-098422 | 3/1992 |
| JP | 2002-334110 | 11/2002 |
| JP | 2003-345830 | 12/2003 |
| JP | 2004-274431 | 9/2004 |
| JP | 2004-354111 | 12/2004 |

(Continued)

OTHER PUBLICATIONS

Kohonen, T.; Oja, E.; Simula, O.; Visa, A.; Kangas, J.; , "Engineering applications of the self-organizing map," Proceedings of the IEEE, vol. 84, No. 10, pp. 1358-1384, Oct. 1996.*

(Continued)

*Primary Examiner* — Kakali Chaki
*Assistant Examiner* — Daniel Pellett
(74) *Attorney, Agent, or Firm* — Scully, Scott, Murphy & Presser, P.C.

(57) ABSTRACT

A determination device includes a region information recording unit that records therein region information regarding a closed region corresponding to a data distribution shape of a same category within a feature space, the closed region being formed by a plurality of nodes and line segments connecting the plurality of nodes. The determination device also includes a category deciding unit that decides a category of a determination target based on the region information and a position of the determination target within the feature space.

21 Claims, 7 Drawing Sheets

(56) References Cited

FOREIGN PATENT DOCUMENTS

| | | |
|---|---|---|
| JP | 2005-025351 | 1/2005 |
| JP | 2006-012069 | 1/2006 |
| JP | 2006-058979 | 3/2006 |

OTHER PUBLICATIONS

Kohonen, T.; , "The self-organizing map," Proceedings of the IEEE , vol. 78, No. 9, pp. 1464-1480, Sep. 1990.*
Roth, Dan, Ming-Hsuan Yang, and Narendra Ahuja. "A SNoW-based face detector." Urbana 51 (2000): 61801.*
Pakhira, Malay K., Sanghamitra Bandyopadhyay, and Ujjwal Maulik. "A study of some fuzzy cluster validity indices, genetic clustering and application to pixel classification." Fuzzy sets and systems 155.2 (2005): 191-214.*
Kanungo, Tapas, et al. "An efficient k-means clustering algorithm: Analysis and implementation." Pattern Analysis and Machine Intelligence, IEEE Transactions on 24.7 (2002): 881-892.*
Xia, Chenyi, et al. "Border: efficient computation of boundary points." Knowledge and Data Engineering, IEEE Transactions on 18.3 (2006): 289-303.*
Ngai, Wang Kay, et al. "Efficient clustering of uncertain data." Data Mining, 2006. ICDM'06. Sixth International Conference on. IEEE, 2006.*
Krishnapuram, Raghuram, Hichem Frigui, and Olfa Nasraoui. "Fuzzy and possibilistic shell clustering algorithms and their application to boundry detection and surface approximation. I." Fuzzy Systems, IEEE Transactions on 3.1 (1995): 29-43.*
Lee, Ickjai, and Vladimir Estivill-Castro. "Polygonization of point clusters through cluster boundary extraction for geographical data mining." Advances in Spatial Data Handling. Springer Berlin Heidelberg, 2002. 27-40.*
Dave, Rajesh N. "Validating fuzzy partitions obtained through<i>c</i>-shells clustering." Pattern Recognition Letters 17.6 (1996): 613-623.*
Brandt et al., WO 2002/057955 A1.*
Vatchkov et al., WO 2005/001757 A1.*
Vesanto, Juha, and Esa Alhoniemi. "Clustering of the self-organizing map." Neural Networks, IEEE Transactions on 11.3 (2000): 586-600.*
Orozco-Alzate, Mauricio, and César Germán Castellanos-Domínguez. "Comparison of the nearest feature classifiers for face recognition." Machine Vision and Applications 17.5 (2006): 279-285.*
Chien, Jen-Tzung, and Chia-Chen Wu. "Discriminant waveletfaces and nearest feature classifiers for face recognition." Pattern Analysis and Machine Intelligence, IEEE Transactions on 24.12 (2002): 1644-1649.*
Zhou, Yonglei, Changshui Zhang, and Jingchun Wang. "Extended nearest feature line classifier." PRICAI 2004: Trends in Artificial Intelligence. Springer Berlin Heidelberg, 2004. 183-190.*
Li, Stan Z., and Juwei Lu. "Face recognition using the nearest feature line method." Neural Networks, IEEE Transactions on 10.2 (1999): 439-443.*
Li, Stan Z., Kap Luk Chan, and Changliang Wang. "Performance evaluation of the nearest feature line method in image classification and retrieval." IEEE Transactions on Pattern Analysis and Machine Intelligence 22.11 (2000): 1335-1349.*
International Search Report dated Sep. 22, 2008.
Japanese Official Action dated Jul. 31, 2012 from related application JP 2007-210379 together with an English language translation.
Japanese Official Action dated Dec. 4, 2012 from related application JP 2007-210379 together with an English language translation.

* cited by examiner

CATEGORY DETERMINATION DEVICE AND METHOD COMPRISING A FEATURE SPACE CONTAINING A CLOSED REGION USED TO DETERMINE THE CATEGORY OF A TARGET BASED ON THE POSITION OF THE TARGET WITHIN THE FEATURE SPACE WITH REFERENCE TO THE CLOSED REGION

CROSS-REFERENCE TO RELATED APPLICATIONS

This application is a continuation-in-part of PCT international application Ser. No. PCT/JP2008/063210 filed on Jul. 23, 2008 which designates the United States, incorporated herein by reference, and which claims the benefit of priority from Japanese Patent Applications No. 2007-210379, filed on Aug. 10, 2007, incorporated herein by reference.

BACKGROUND OF THE INVENTION

1. Field of the Invention

The present invention relates to a determination device and a determination method for determining the category of a determination target based on a plurality of feature values regarding the determination target.

2. Description of the Related Art

There have been known determination devices that automatically determine the condition of a road surface on the basis of a captured image of the road surface or determination devices that automatically determines the condition on a silicon wafer on the basis of a captured image of the silicon wafer. Such determination devices classify conditions of an object captured in an image into a plurality of categories and, based on feature values such as luminance or color saturation of the image, determine the category to which the object belongs so that the condition of the object is determined.

Typically, for example, in a feature space having a feature value such as a coordinate axis, a conventional determination device considers the distribution of teaching data of each category as a set of normal distribution (contaminated normal distribution), estimates a probability density function indicating the occurrence probability of the data of each category, and determines the category of the target data based on the probability density function (see Japanese Laid-open Patent Publication No. 2004-274431).

Alternatively, a conventional determination device decides, within a feature space, on representative data (prototype) representing the distribution of the teaching data of each category and, based on the distance between the prototype and the target data within the feature space, determines the category of the target data (see Japanese Laid-open Patent Publication No. 2006-12069).

SUMMARY OF THE INVENTION

A determination device according to an aspect of the present invention includes a region information recording unit that records therein region information regarding a closed region corresponding to a data distribution shape of a same category within a feature space, the closed region being formed by a plurality of nodes and line segments connecting the plurality of nodes. The determination device also includes a category deciding unit that decides a category of a determination target based on the region information and a position of the determination target within the feature space.

A determination method according to another aspect of the present invention includes recording region information regarding a closed region corresponding to a data distribution shape of a same category within a feature space, the closed region being formed by a plurality of nodes and line segments connecting the plurality of nodes; and deciding a category of a determination target based on the region information and a position of the determination target within the feature space.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a determination device and a determination method according to the present invention are described in detail below with reference to the accompanying drawings. The present invention is not limited to the present embodiments. Moreover, in the description of each drawing, the same constituent elements are referred to by the same reference numerals.

Figure 1:
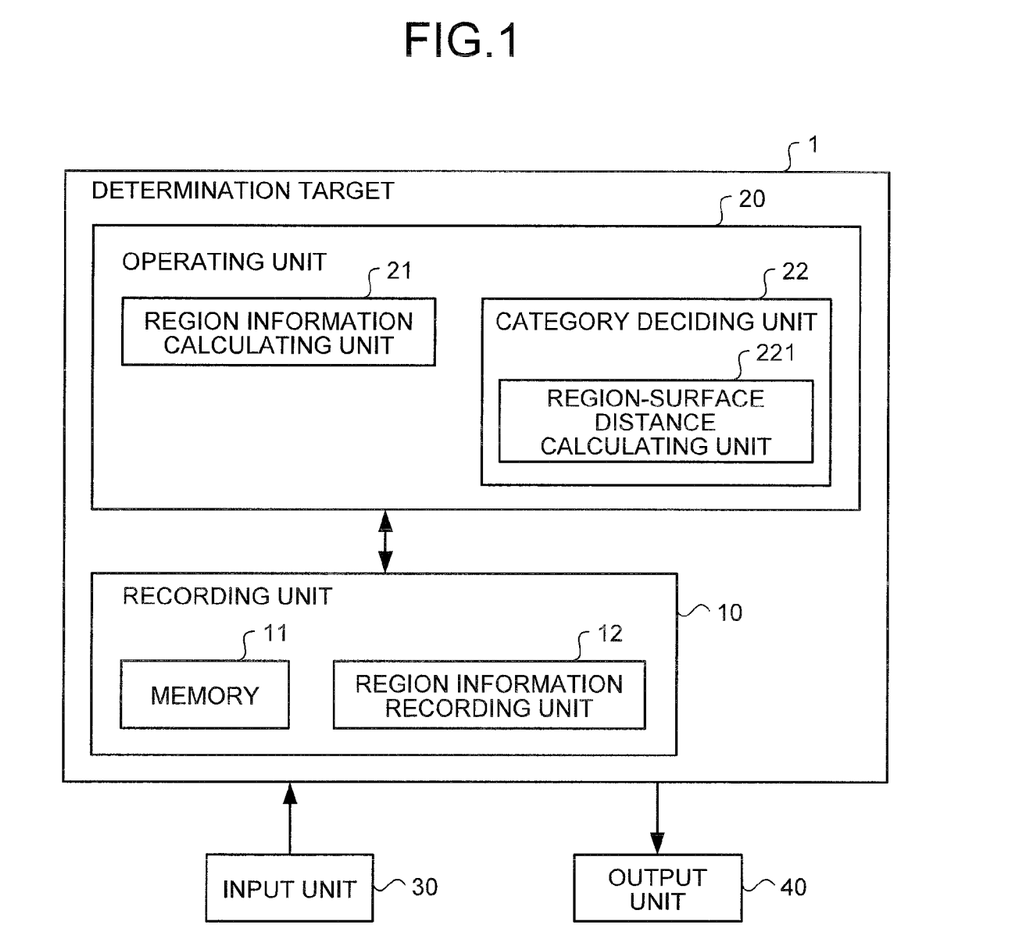
FIG. 1 is a block diagram of an overall configuration of a determination device according to an embodiment of the present invention.

FIG. 1 is a block diagram of an overall configuration of a determination device according to an embodiment of the present invention. As illustrated in FIG. 1, a determination device 1 includes a recording unit 10 that records therein a variety of information and an operating unit 20 that, based on the information recorded in the recording unit 10, performs the operation of determining the category to which a determination target belongs. The determination device 1 are connected to an input unit 30 that receives input of a variety of information and an output unit 40 that outputs determination results.

The recording unit 10 is put into practice using an integrated circuit (IC) memory such as a read only memory (ROM) or a random access memory (RAM) of updatable flash memory type, an embedded hard disk drive or a hard disk drive connected to a data communication terminal, or an information recording medium such as a compact disk read only memory (CD-ROM) along with a reading device to read information therefrom. The recording unit 10 includes a memory 11 that is used to record information such as various processing programs, processing parameters of each processing program, and processing data that is processed by the operating unit 20.

Besides, the recording unit 10 also includes a region information recording unit 12 that is used to store region information of each category. Herein, the region information is information indicating the distribution region of data in each category within a feature space. More particularly, the region information is information on closed regions each being formed within a feature space by a plurality of nodes arranged according to the distribution of data in each category and by line segments connecting those nodes.

The operating unit 20 is put into practice using a central processing unit (CPU) that executes the various processing programs stored in the recording unit 10. Particularly, the operating unit 20 includes a region information calculating unit 21 that calculates region information and a category deciding unit 22 that, based on the region information, decides on the category to which a determination target belongs. The category deciding unit 22 includes a region-surface distance calculating unit 221 that calculates, within the feature space, the distance between the determination target and the surface of the closed region in each category. Based on the distances between the determination target and the surfaces of the closed regions, the category deciding unit 22 decides on the category of the determination target. Meanwhile, the mechanism for calculating teaching data and the feature values of a determination target is different for each determination target and is not particularly mentioned in the present embodiment.

The input unit 30 is put into practice using a variety of switches, an entry keyboard, a mouse, a touch-sensitive panel, a universal serial bus (USB), and a communication interface such as IEEE 1394. The input unit 30 receives, from outside, the input of information regarding the teaching data of each category and the feature values of determination targets. Meanwhile, the input unit 30 can also be put into practice using an interface compatible to a portable recording medium such as different types of memory cards, a compact disk (CD), or a digital versatile disk (DVD). In that case, the input unit 30 can receive, from the portable recording medium, the input of information regarding the teaching data of each category or region information.

The output unit 40 is put into practice using a liquid crystal display and displays a variety of information including images. Besides, the output unit 40 displays a graphical user interface (GUI) using which the operator can input a variety of processing information.

Figure 2:
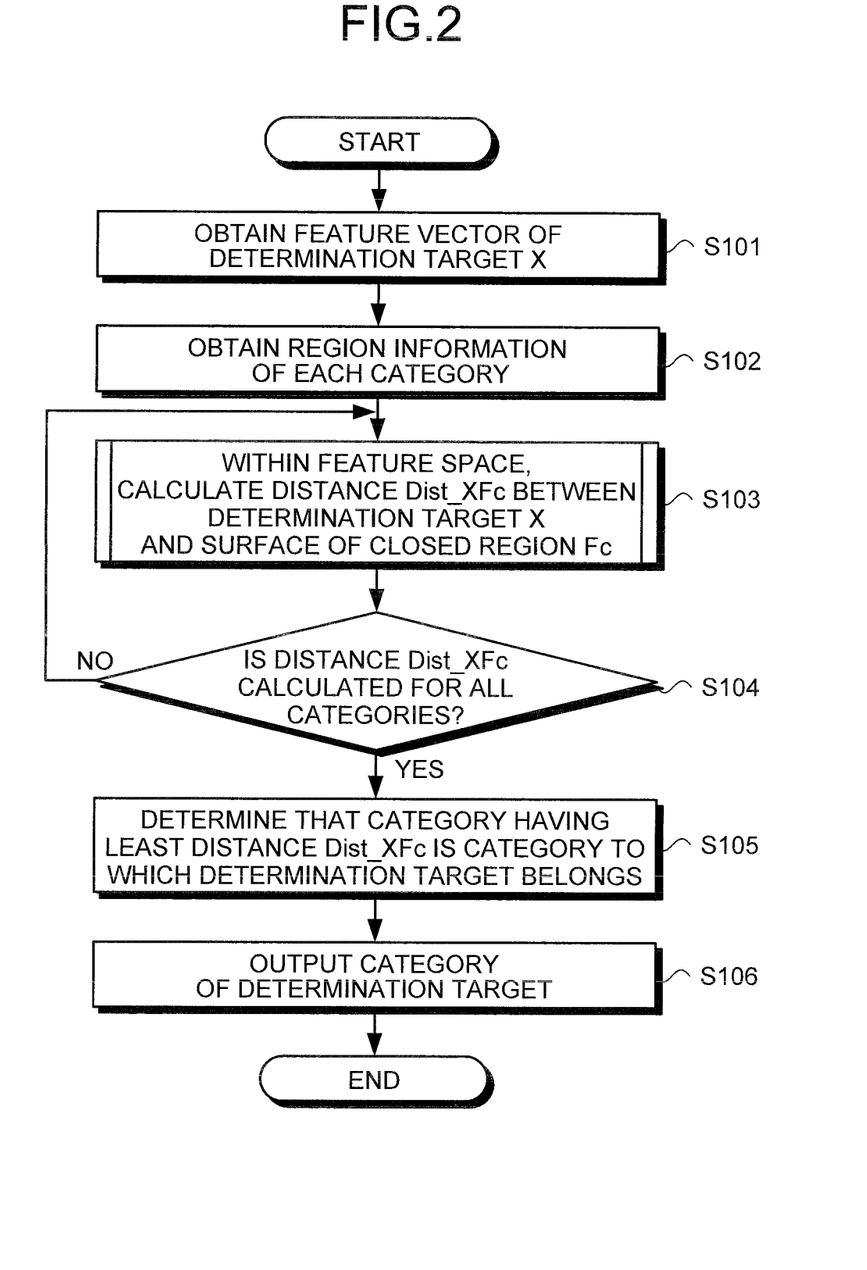
FIG. 2 is a flowchart for explaining the sequence of determination process performed by the determination device illustrated in FIG. 1.

Given below is the description with reference to FIG. 2 about the sequence of a category deciding operation with respect to a determination target. FIG. 2 is a flowchart for explaining the sequence of a category deciding operation performed by the determination device 1. First, the operating unit 20 obtains a feature vector of a determination target X (Step S101).

Herein, the feature vector is the vector representation of a plurality of feature values $x_j$ (j=1 to K) indicating the features of a determination target and is presented in the form of Equation (1) given below. In Equation (1), T represents the transposition and K represents the dimension number of the feature vector. That is, K represents the number of types of the feature values representing the determination target X. In the present embodiment, the dimension number of the feature vector is assumed to be two (K=2). A feature vector of a determination target or teaching data indicates the coordinates of that determination target or teaching data within a feature space.

$$X = (x_1, x_2, \ldots, x_K)^T \quad (1)$$

Subsequently, the category deciding unit 22 obtains the region information of each category within the feature space from the region information recording unit 12 (Step S102). Then, the region-surface distance calculating unit 221 calculates, within the feature space, a distance Dist_XFc between the determination target X and the surface of a closed region Fc (Step S103). The category deciding unit 22 then determines whether the distance Dist_XFc has been calculated with respect to each category recorded in the region information recording unit 12 (Step S104). If the distance Dist_XFc is yet to be calculated with respect to a particular category (No at Step S104), then the category deciding unit 22 repeats the operation at Step S103.

Upon calculating the distance Dist_XFc with respect to all categories (Yes at Step S104), the category deciding unit 22 determines that the category having the least distance Dist_XFc is the category to which the determination target X belongs (Step S105). Then, the operating unit 20 outputs the category information of the determination target X to the output unit 40 (Step S106) and finishes the category deciding operation in the determination device 1. In this way, based on the distance between the determination target X and the surface of the closed region Fc within the feature space, the determination device 1 decides on the category to which the determination target X belongs.

At Step S102, the category deciding unit 22 obtains region information that has been calculated in advance by the region information calculating unit 21 and recorded in the region information recording unit 12. In the present embodiment, the region information calculating unit 21 calculates the region information of each category by making use of the self-organizing feature map (for example, see Self-organizing Map (revised edition), author: T. Kohonen, editor: Heizo Tokutaka et al., Springer-Verlag Tokyo, 2005).

The self-organizing feature map is a type of neural network that is, for example, a two-layer network including an input layer and an output layer. According to the self-organizing feature map, it becomes possible to decide on representative vectors corresponding to data distribution within a feature space while maintaining the connection relation between representative vectors that are set in advance. In the present embodiment, the teaching data of each category is input to the input layer of the neural network and the connection relation between the representative vectors is presented as the composition of the output layer.

Figure 3:
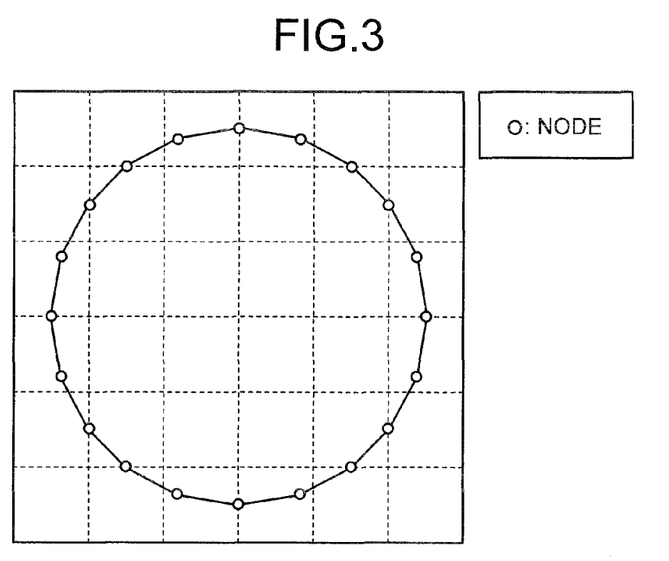
FIG. 3 is a schematic diagram illustrating the initial value of each node constituting a substantially circular-shaped output layer and the connection relation of each node.

Given below is the description about the region information calculating operation performed by the region information calculating unit 21. First, with respect to each node constituting a substantially circular-shaped output layer as illustrated in FIG. 3, the region information calculating unit 21 allots a random numerical vector of the same dimension to the dimension of the feature space. At that time, the numerical vectors are set as the initial values of the numerical vectors, that is, of the representative vectors of the nodes.

Subsequently, with respect to the feature vector of teaching data $X_L$, the region information calculating unit 21 obtains a node Nw to which the most analogous numerical vector has been allotted. Then, the region information calculating unit 21 corrects the numerical vector of the node Nw and the numerical vectors of the nodes adjacent to the node Nw in the output layer so that the corrected numerical vectors are analogous to the feature vector of teaching data $X_L$. For single teaching data, the region information calculating unit 21 repeats, for a predetermined number of times, the process of deciding on the most analogous node and correcting the numerical vector of the most analogous node and the numerical vectors of the adjacent nodes to the most analogous node in the output layer.

With respect to each category, the region information calculating unit 21 corrects the numerical vectors of the nodes with the use of a plurality of pieces of teaching data and then stores, in the region information recording unit 12, the information on the numerical vector eventually allotted to each node and the connection relation of each node as the region information.

Moreover, with the use of predetermined functions used in the self-organizing feature map, the region information calculating unit 21 determines the extent of node adjacency with respect to the node Nw in order to set the numerical vectors of the adjacent nodes that are to be corrected along with the numerical vector of the node Nw and sets the extent of analogy for the numerical vector of each node with respect to the feature vector of the teaching data $X_L$. Usually, the region information calculating unit 21 makes those settings in such a way that the amount of correction decreases as the number of corrections increases.

Figure 4:
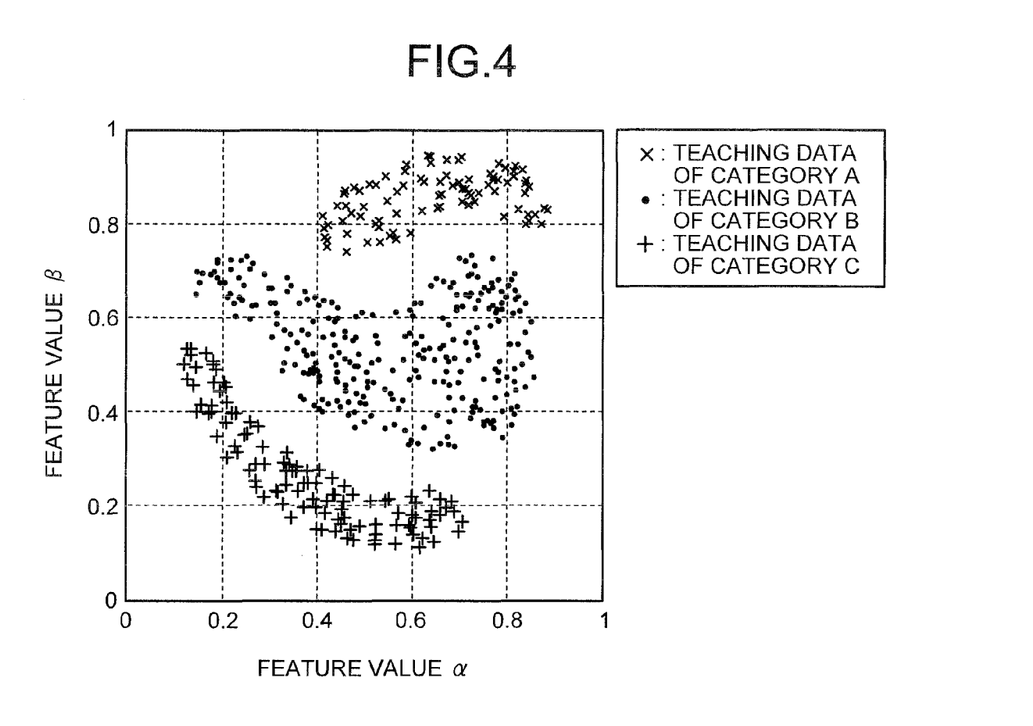
FIG. 4 is a schematic diagram of a specific example of the distribution of teaching data.
Figure 5:
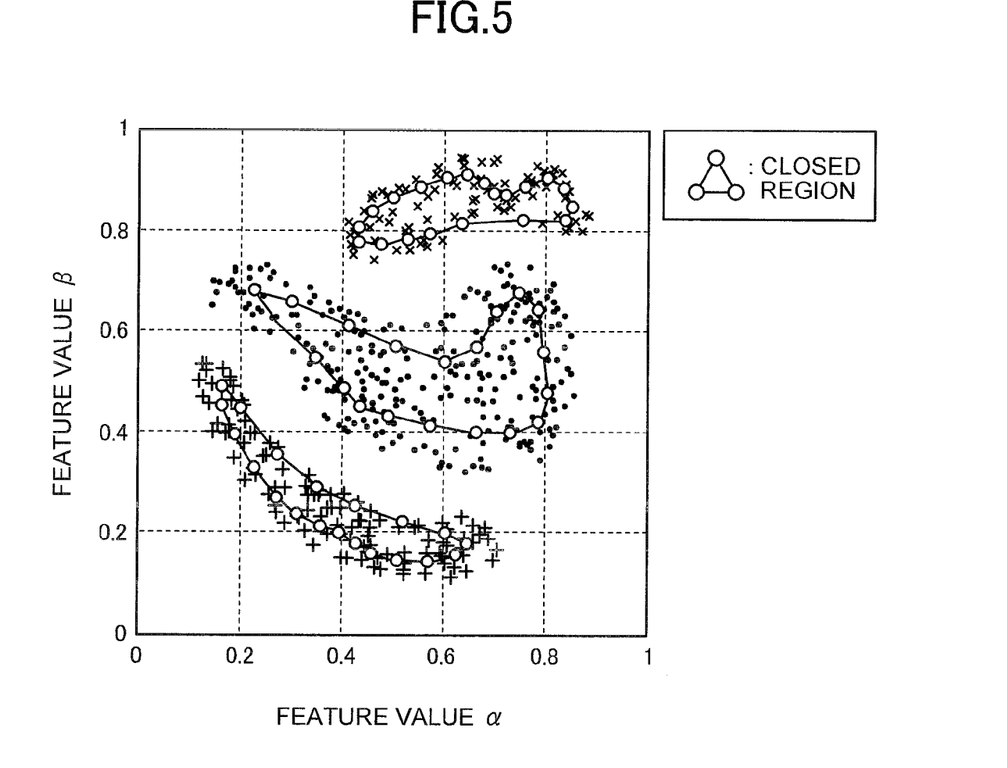
FIG. 5 is a schematic diagram of a specific example of a closed region within a two-dimensional feature space.

FIG. 4 is a schematic diagram of a specific example of the distribution of teaching data of three types of categories in a two-dimensional feature space. FIG. 5 is a schematic diagram of a closed region calculated using the self-organizing feature map with respect to the distribution of teaching data of each category illustrated in FIG. 4. As illustrated in FIG. 5, within the feature space, each closed region enclosed by the corresponding nodes and the line segments connecting those nodes represents a distribution region of the corresponding teaching data. Thus, it becomes clear that the region information is the information on the representative vectors corresponding to the data distribution of each category and the connection between the representative vectors within a feature space. From among a plurality of categories having mutually non-overlapping closed regions as illustrated in FIG. 5, the determination device 1 determines the category to which the determination target belongs.

In the present embodiment, the region information calculating unit 21 is configured to calculate the closed regions using the self-organizing feature map. Alternatively, the user can be allowed, while viewing the distribution of the teaching data within the feature space, to specify the node positions and the node connections in accordance with the distribution shape of the teaching data, take the contour of the distribution region of the teaching data, and artificially create a closed region. As long as that closed region represents the distribution shape of the corresponding teaching data, there is no need to include the entire teaching data in the closed region. Meanwhile, a closed region is a definitely closed and finite region.

Figure 6:
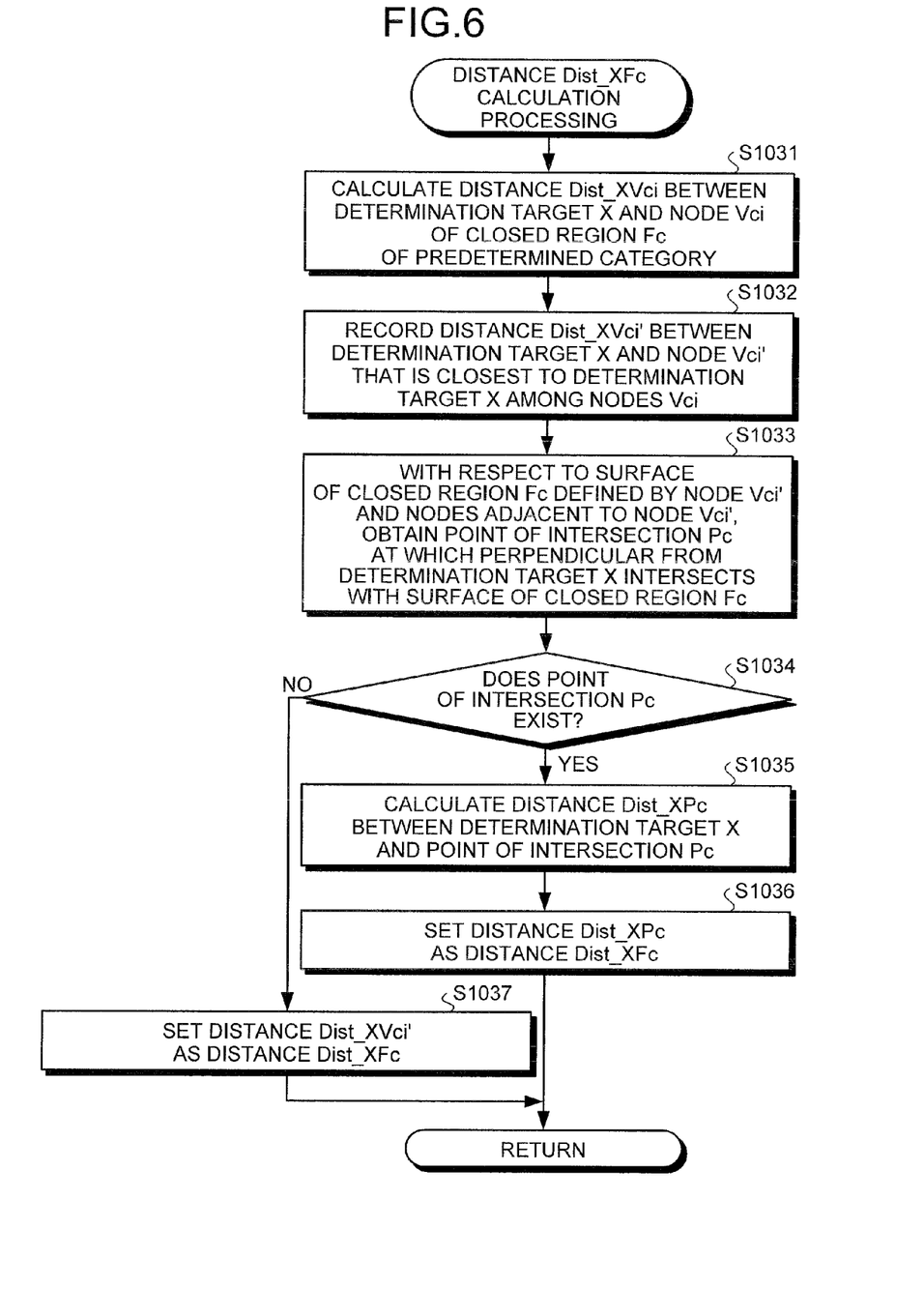
FIG. 6 is a flowchart for explaining the sequence of operations in calculating the distance between a determination target and a closed region within a feature space.

As described at Step S103, the region-surface distance calculating unit 221 calculates, within the feature space, the distance Dist_XFc between the determination target X and the closed region Fc of each category. For that calculation, following sequence of operations is performed. FIG. 6 is a flowchart for explaining the sequence of operations in calculating the distance between the determination target X and the closed region Fc of a predetermined category. As illustrated in FIG. 6, first, the region-surface distance calculating unit 221 calculates, within the feature space, a distance Dist_XVci between the determination target X and each node Vci in the closed region Fc of the predetermined category (Step S1031).

Subsequently, from among the nodes Vci, the region-surface distance calculating unit 221 obtains a node Vci' that is closest to the determination target X and stores, in the recording unit 10, a distance Dist_XVci' between the determination target X and the node Vci' (Step S1032). Then, within the feature space, the region-surface distance calculating unit 221 performs, with respect to the surface of the closed region Fc defined by the line segments connecting the node Vci' and the nodes having the connection relation with the node Vci', a search for a point of intersection Pc at which a perpendicular from the determination target X intersects with the surface of the closed region Fc (Step S1033). The region-surface distance calculating unit 221 then determines whether the point of intersection Pc exists (Step S1034).

If the point of intersection Pc exists (Yes at Step S1034), then the region-surface distance calculating unit 221 calculates, within the feature space, a distance Dist_XPc between the determination target X and the point of intersection Pc (Step S1035), sets that value as the distance Dist_XFc between the determination target X and the closed region Fc (Step S1036), and finishes the process of calculating the distance Dist_XFc. On the other hand, if the point of intersection Pc does not exist (No at Step S1034), then the region-surface distance calculating unit 221 sets the distance Dist_XVci' as the distance Dist_XFc (Step S1037) and finishes the process of calculating the distance Dist_XFc. Then, the system control returns to Step S103 in FIG. 2 and moves on to Step S104. In this way, within the feature space, the region-surface distance calculating unit 221 calculates the minimum distance between the determination target X and the closed region Fc and sets that minimum distance as the distance Dist_XFc.

Meanwhile, at Steps S1031 and S1035, the region-surface distance calculating unit 221 uses Euclidean distances as the distances Dist_XVci and Dist_XPc. For example, as Euclidean distance, the distance Dist_XVci can be calculated using Equation (2) given below.

$$\text{Dist\_XVci} = \left\{ \sum_{j=1}^{K} (vci_j - x_j)^2 \right\}^{\frac{1}{2}} \quad (2)$$

In Equation (2), K represents the dimension number of the feature vector. In the present embodiment, K is assumed to be two (K=2). Moreover, $vci_j$ represents a component (feature value) of the numerical vector of the node Vci and $x_j$ represents a component (feature value) of the representative vector of the determination target X.

Figure 7:
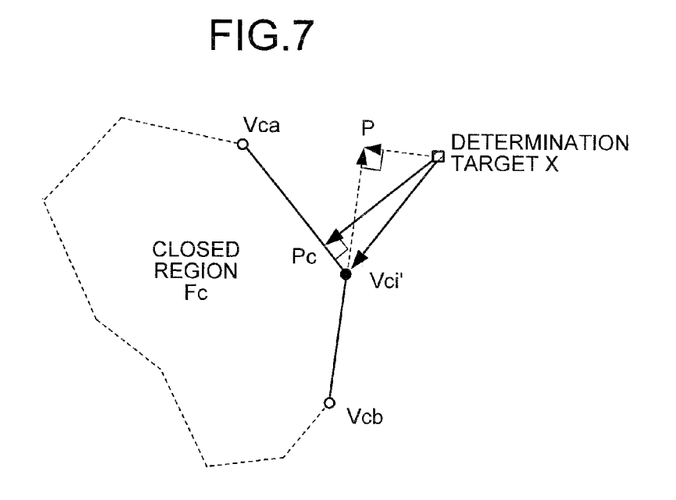
FIG. 7 is a schematic diagram illustrating the process of calculating the distance between a determination target and a closed region within a two-dimensional feature space.

Meanwhile, at Step S1033, the region-surface distance calculating unit 221 obtains the point of intersection Pc based on the representative vector of the determination target X and the numerical vectors of the nodes. FIG. 7 is a schematic diagram illustrating the positional relation between the closed region Fc, the point of intersection Pc, and the determination target X within a two-dimensional feature space. As illustrated in FIG. 7, the point of intersection Pc lies on the line segment connecting the node Vci' and a node Vca that has a connection relation with the node Vci'. The coordinates of the point of intersection Pc within the feature space can be calculated by solving Equation (3) given below. By solving Equation (3), a real number t is also calculated along with the coordinates of the point of intersection Pc. When the point of intersection Pc exists on the surface of the closed region Fc as illustrated in FIG. 7, the value of t is in the range of 0 and 1.

$$\begin{cases} \overrightarrow{XPc} \cdot \overrightarrow{Vci'Vca} = 0 \\ \overrightarrow{Vci'Pc} = t \times \overrightarrow{Vci'Vca} \end{cases} \quad (3)$$

where symbol "•" represents inner product and t represents a real number.

In an identical manner to the node Vca and with respect to a straight line passing through the node Vci' and a node Vcb that has a connection relation with the node Vci' within the feature space, the coordinates of a point of intersection P at which a perpendicular from the determination target X intersects with the above-mentioned straight line can be calculated by substituting the numerical vector of the node Vcb for the numerical vector of the node Vca in Equation (3). However, in that case, the real number t has a negative value and, as illustrated in FIG. 7, the point of intersection P lies on the extended line of the line segment connecting the nodes Vcb and Vci'. That is, the point of intersection P does not lie on the surface of the closed region Fc.

In practice, the region-surface distance calculating unit 221 makes use of Equation (3) and calculates, within the feature space, the coordinates of points of intersection between each straight line, which connects the node Vci' and a node having a connection relation with the node Vci', and the perpendicular from the determination target X with respect to that straight line as well as calculates the corresponding real number t. Based on whether the real number t is in the range of 0 and 1, the region-surface distance calculating unit 221 determines whether the corresponding point of intersection lies on the surface of the closed region Fc. If a particular point of intersection exists on the surface of the closed region Fc, then the region-surface distance calculating unit 221 sets the coordinates of that point of intersection as the coordinates of the point of intersection Pc. Thus, the region-surface distance calculating unit 221 makes use of the node Vci' and the nodes having a connection relation with the node Vci' for calculating the coordinates of the point of intersection Pc in an exploratory manner.

In this way, within a two-dimensional feature space, the determination device 1 calculates the distance between the closed region of each category and a determination target and determines that the category having the closest closed region to the determination target as the category to which the determination target belongs. As compared to conventional determination devices, a closed region represents the distribution of teaching data within a feature space more accurately with less representative data. Hence, even if the distribution of the teaching data is complex, the determination device 1 is able to accurately determine, with less amount of calculation, the category to which a determination target belongs. That enables achieving reduction in the time taken for the determination process.

In the abovementioned embodiment, the feature space is assumed to be two-dimensional. Alternatively, in a modification example of the abovementioned embodiment, the feature space is assumed to be three-dimensional. That is, in Equation (1) representing the feature vector, K is assumed to be three (K=3) and the category deciding unit 22 calculates, within the three-dimensional feature space, the distance between a determination target and a closed region and determines the category of the determination target.

Figure 8:
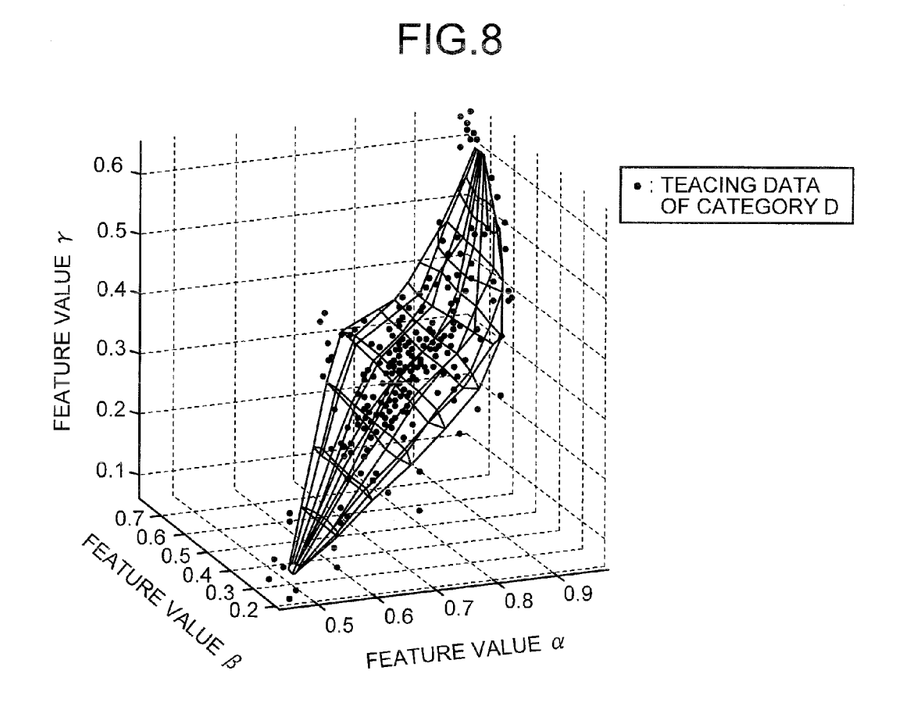
FIG. 8 is a schematic diagram of a specific example of a closed region within a three-dimensional feature space.

In this case, the region information calculating unit 21 corrects, with the use of the self-organizing feature map, the numerical vector of each node constituting the substantially circular-shaped output layer and calculates a stereoscopic closed region as illustrated in FIG. 8.

Figure 9:
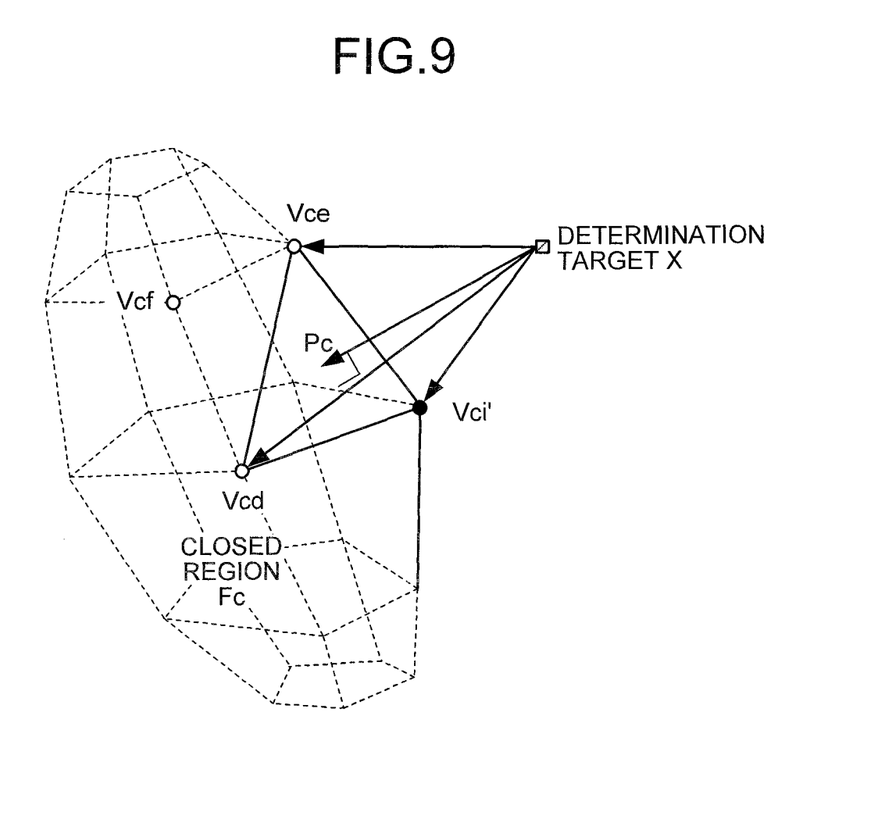
FIG. 9 is a schematic diagram illustrating the process of calculating the distance between a determination target and a closed region within a three-dimensional feature space.

Then, at Step S1031, the region-surface distance calculating unit 221 sets K=3 in Equation (2) and calculates the distance Dist_XVci between the determination target X and each node. Moreover, at Step S1033, the region-surface distance calculating unit 221 calculates, within the three-dimensional feature space, the coordinates of the point of intersection P at which a perpendicular from the determination target X intersects with a plane passing through the node Vci', which is closest to the determination target X, and two other nodes having a connection relation with the node Vci'. More particularly, as illustrated in FIG. 9, the region-surface distance calculating unit 221 calculates makes use of the feature vector of the node Vci' and the feature vectors of nodes Vcd and Vce, which have a connection relation with the node Vci', and calculates the point of intersection P with Equation (4) given below.

$$\begin{cases} \vec{n} = \overrightarrow{Vci'Vcd} \otimes \overrightarrow{Vci'Vce} \\ \overrightarrow{Vci'P} \cdot \vec{n} = 0 \\ \overrightarrow{XP} = t \times \vec{n} \end{cases} \quad (4)$$

where symbol "⊗" represents outer product, symbol "•" represents inner product, and t represents a real number. Subsequently, with Equation (5) given below, the region-surface distance calculating unit 222 calculates a linear combination vector Z at the time of representing $\overrightarrow{XP}$ as a linear combination of $\overrightarrow{XVci'}$, $\overrightarrow{XVcd}$, and $\overrightarrow{XVce}$.

$$Z = [\overrightarrow{XVci'} \overrightarrow{XVcd} \overrightarrow{XVce}]^{-1} * \overrightarrow{XP} \quad (5)$$

where each of linear combination vector Z, $\overrightarrow{XVci'}$, $\overrightarrow{XVcd}$, and $\overrightarrow{XVce}$ is a three-dimensional longitudinal vector, [Q]−1 represents an inverse matrix of a matrix Q, and symbol "*" represents matrix product.

If all components of the linear combination vector Z have positive values, then the region-surface distance calculating unit 221 determines that the point of intersection P lies on the surface of the closed region Fc, which is enclosed by the nodes Vci', Vcd, and Vce as illustrated in FIG. 9, and sets the coordinates of the point of intersection P as the coordinates of the point of intersection Pc. On the other hand, if the components of the linear combination vector Z include a component having negative value, then the region-surface distance calculating unit 221 determines that the point of intersection P does not lie on the surface of the closed region Fc. Thus, the region-surface distance calculating unit 221 obtains the coordinates of the point of intersection Pc and calculates the distance Dist_XPc. Eventually, the region-surface distance calculating unit 221 compares the distance Dist_XVci' with the distance Dist_XPc and sets the smaller of the two distances as the distance Dist_XFc.

In this way, even in a three-dimensional feature space, the determination device 1 is able to calculate the distance between the surface of the closed region Fc of each category and a determination target. Thus, even when the teaching data and the determination target have three types of feature values, the determination device 1 is able to accurately determine, with less amount of calculation as compared to conventional determination devices, the category to which a determination target belongs.

According to an aspect of the present invention, the category of a determination target is determined based on the position of the determination target within a feature space and on region information of each category recorded in a region information recording unit. For that reason, as compared to conventional determination devices, the determination target is determined using the region information that accurately represents the distribution of teaching data with less representative data. Hence, even if the distribution of the teaching data is complex, the category to which the determination target belongs can be accurately determined with less amount of calculation as compared to conventional determination devices. That enables achieving reduction in the time taken for the determination process.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A determination device comprising:
   a region information recording unit that records therein region information regarding a closed region corresponding to a data distribution shape of a same category within a feature space, the closed region with an outer surface being formed by a plurality of nodes placed in accordance with the data distribution shape and line segments connecting the plurality of nodes and being a definitely closed and finite region in which every node is used to enclose the closed region;
   a region-surface distance calculating unit that:
      detects a closest node to a determination target from the plurality of nodes of the closed region,
      determines the line segments that are connected to the closest node,
      calculates perpendicular distances between the determination target and points of intersection on the line segments connected to the closest node within the feature space, and
      calculates a minimum perpendicular distance from the calculated perpendicular distances, wherein if the perpendicular distances do not exist between the determination target and the points of intersection on the line segments connected to the closest node, a distance between the determination target and the closest node is substituted for the minimum perpendicular distance; and
   a category deciding unit that decides a category of the determination target corresponding to the minimum perpendicular distance between the determination target and the point of intersection on the line segment connected to the closest node of the closed region within the feature space.

2. The determination device according to claim 1, wherein the region information recording unit records therein the region information for a plurality of categories of the data distribution shape.

3. The determination device according to claim 2, wherein the closed region is mutually non-overlapping.

4. The determination device according to claim 1, further comprising a region information calculating unit that calculates the region information by arranging each of the plurality of nodes of the closed region to match the data distribution shape of the same category within the feature space using a self-organizing feature map.

5. The determination device according to claim 4, the region information calculating unit configured to perform:
   allotting, for each node of the plurality of nodes of the closed region, a random numerical vector of the same dimension as the feature space;
   correcting a numerical vector of the node so that the corrected numerical vector is analogous to a feature vector of teaching data; and
   storing the numerical vector allotted for each node and a connection relation of each node as the region information.

6. The determination device according to claim 1, wherein one of the plurality of nodes is most analogous to a feature vector of teaching data of the category, and the one node and a plurality of nodes adjacent to the one node are corrected to the feature vector of the teaching data.

7. The determination device according to claim 1, wherein the region information recording unit records therein the region information for a plurality of categories of the data distribution shape, and the region-surface distance calculating unit iterates the detecting step, the determining step, the perpendicular distances calculating step and the minimum perpendicular distance calculating step with respect to each category to determine the minimum perpendicular distance from the perpendicular distances between the determination target and the plurality of categories.

8. The determination device according to claim 7, wherein the category deciding unit decides that the determination target belongs to the category having the closed region with the minimum perpendicular distance.

9. A determination method comprising:
   obtaining region information regarding a closed region from a region information recording unit, the closed region corresponding to a data distribution shape of a same category within a feature space, the closed region having an outer surface being formed by a plurality of nodes and line segments connecting the plurality of nodes and being a definitely closed and finite region in which every node is used to enclose the closed region;
   detecting a closest node to a determination target from the plurality of nodes forming the closed region;
   determining the line segments that are connected to the closest node;
   calculating perpendicular distances between the determination target and points of intersection on the line segments connected to the closest node within the feature space;
   calculating a minimum perpendicular distance from the calculated perpendicular distances, wherein if the perpendicular distances do not exist between the determination target and the points of intersection on the line segments connected to the closest node, a distance between the determination target and the closest node is substituted for the minimum perpendicular distance; and
   deciding, using a CPU, a category of the determination target corresponding to the minimum perpendicular distance between the determination target and the point of intersection on the line segment connected to the closest node of the closed region within the feature space.

10. The determination method according to claim 9, wherein the detecting step, the determining step, the perpendicular distances calculating step and the minimum perpendicular distance calculating step are iterated with respect to each category so as to determine the minimum perpendicular distance from all of the calculated perpendicular distances between the determination target and the all categories.

11. The determination method according to claim 10, wherein the deciding step decides that the determination target belongs to the category having the closed region with the minimum perpendicular distance.

12. A determination device comprising:
a region information recording unit that records therein region information regarding a closed region corresponding to a data distribution shape of a same category within a feature space, the closed region with an outer surface being formed by a plurality of nodes placed in accordance with the data distribution shape and line segments connecting the plurality of nodes and being a definitely closed and finite region in which every node is used to enclose the closed region;
a region-surface distance calculating unit that:
  detects a closest node to a determination target from the plurality of nodes of the closed region,
  determines the line segments that are connected to the closest node,
  defines planes that are defined by the closest node and any two of neighbor nodes that are connected to the closest node based on the line segments,
  calculates perpendicular distances between the determination target and points of intersection on the planes connected to the closest node within the feature space, and
  calculates a minimum perpendicular distance from the calculated perpendicular distances, wherein if the perpendicular distances do not exist between the determination target and the points of intersection on the planes connected to the closest node, a distance between the determination target and the closest node is substituted for the minimum perpendicular distance; and
a category deciding unit that decides a category of the determination target corresponding to the minimum perpendicular distance between the determination target and the point of intersection on the plane connected to the closest node of the closed region within the feature space.

13. The determination device according to claim 12, wherein the region information recording unit records therein the region information for a plurality of categories of the data distribution shape.

14. The determination device according to claim 13, wherein the closed region is mutually non-overlapping.

15. The determination device according to claim 12, wherein one of the plurality of nodes is most analogous to a feature vector of teaching data of the category, and the one node and a plurality of nodes adjacent to the one node are corrected to the feature vector of the teaching data.

16. The determination device according to claim 12, wherein the region information recording unit records therein the region information for a plurality of categories of the data distribution shape, and the region-surface distance calculating unit iterates the detecting step, the determining step, the defining step, the perpendicular distances calculating step and the minimum perpendicular distance calculating step with respect to each category to determine the minimum perpendicular distance from the perpendicular distances between the determination target and the plurality of categories.

17. The determination device according to claim 16, wherein the category deciding unit decides that the determination target belongs to the category having the closed region with the minimum perpendicular distance.

18. A determination method comprising:
obtaining region information regarding a closed region from a region information recording unit, the closed region corresponding to a data distribution shape of a same category within a feature space, the closed region having an outer surface being formed by a plurality of nodes and line segments connecting the plurality of nodes and being a definitely closed and finite region in which every node is used to enclose the closed region;
detecting a closest node to a determination target from the plurality of nodes forming the closed region;
determining the line segments that are connected to the closest node;
defining planes that are defined by the closest node and any two of neighbor nodes that are connected to the closest node based on the line segments;
calculating perpendicular distances between the determination target and points of intersection on the planes connected to the closest node within the feature space;
calculating a minimum perpendicular distance from the calculated perpendicular distances, wherein if the perpendicular distances do not exist between the determination target and the points of intersection on the planes connected to the closest node, a distance between the determination target and the closest node is substituted for the minimum perpendicular distance; and
deciding, using a CPU, a category of the determination target corresponding to the minimum perpendicular distance between the determination target and the point of intersection on the plane connected to the closest node of the closed region within the feature space.

19. The determination method according to claim 18, wherein the detecting step, the determining step, the defining step, the perpendicular distances calculating step and the minimum perpendicular distance calculating step are iterated with respect to each category so as to determine the minimum perpendicular distance from all of the calculated perpendicular distances between the determination target and the all categories.

20. The determination method according to claim 19, wherein the deciding step decides that the determination target belongs to the category having the closed region with the minimum perpendicular distance.

21. A determination device for determining one of a plurality of categories within a feature space to which a determination target belongs, the determination device comprising:
a region information recording unit configured to record, for each of the plurality of categories, region information on:
  a plurality of nodes arranged according to the distribution of data in the each of the plurality of categories; and
  a plurality of segments connecting the plurality of nodes to form a closed region;
a region-surface distance calculating unit configured to, for the closed region of each of the plurality of categories:
  calculate, for each of the plurality of nodes of the closed region, a distance between the determination target and the each of the plurality of nodes of the closed region;

determine, from the calculated plurality of distances between the determination target and the each of the plurality of nodes of the closed region:
   a closest node from the plurality of nodes of the closed region, the closest node being the closest to the determination target from among the plurality of nodes of the closed region; and
   a distance between the determination target and the closest node;

for each of a plurality of connected nodes having a connection relationship with the closest node, the plurality of connected nodes being from the plurality of nodes of the closed region:
   determine a straight line passing through the each of the plurality of connected nodes and the closest node;
   determine a point of intersection at which a perpendicular from the determination target intersects with the straight line;
   determine whether the point of intersection lies on the segment of the plurality of segments connecting the each of the plurality of connected nodes and the closest node;
   if the point of intersection lies on the segment of the plurality of segments connecting the each of the plurality of connected nodes and the closest node, calculate a distance between the determination target and the point of intersection, and set the distance between the determination target and the point of intersection as one of a plurality of candidate distances; and
   if the point of intersection does not lie on the segment of the plurality of segments connecting the each of the plurality of connected nodes and the closest node, set the distance between the determination target and the closest node as one of the plurality of candidate distances; and set the smallest distance of the plurality of candidate distances as a distance to closed region for the closed region; and a category deciding unit configured to:
   determine the category having the smallest distance to closed region; and
   determine that the determined target belongs to the category having the smallest distance to closed region.

\* \* \* \* \*